Figure 1:
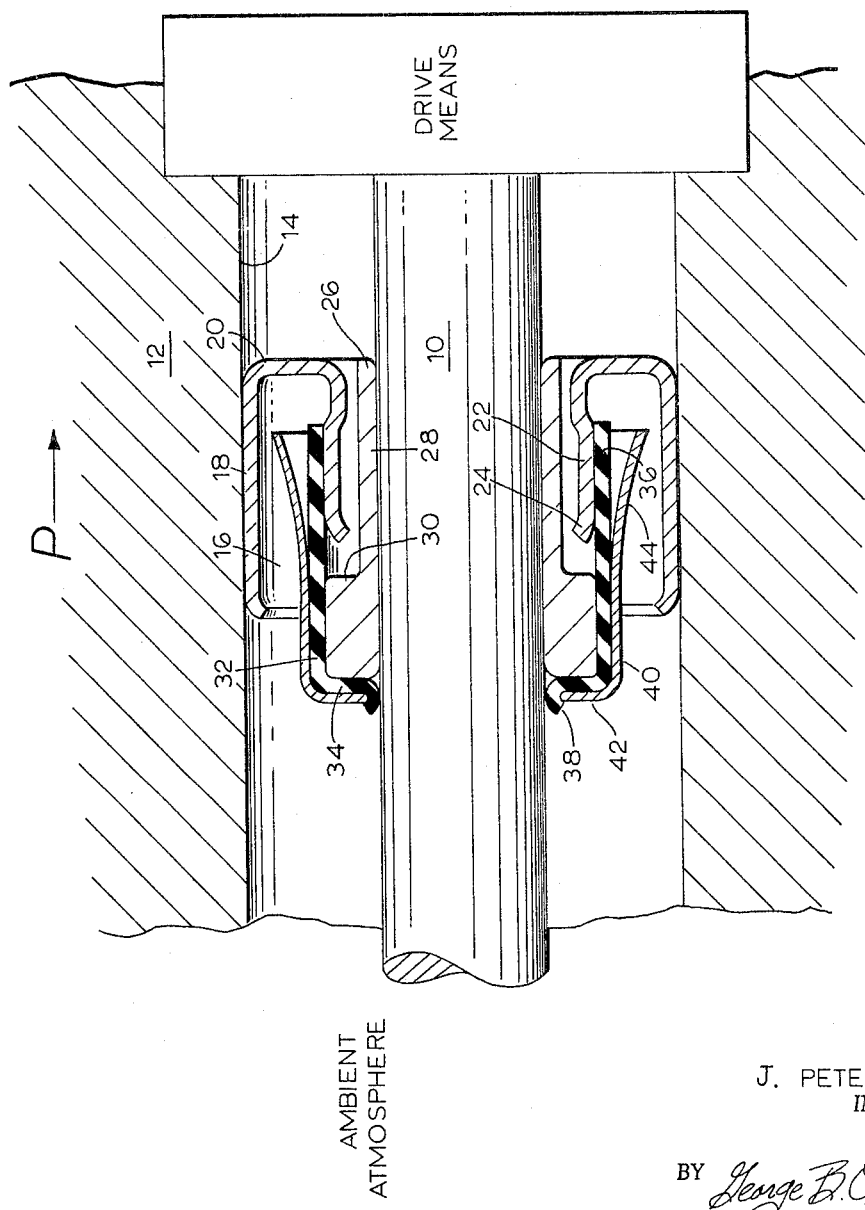

Aug. 16, 1966 J. P. KNAUTH 3,266,811
CENTRIFUGAL SEALING MEANS

Filed July 23, 1963 2 Sheets-Sheet 1

J. PETER KNAUTH
INVENTOR.

BY George B. Oujevolk
ATTORNEY

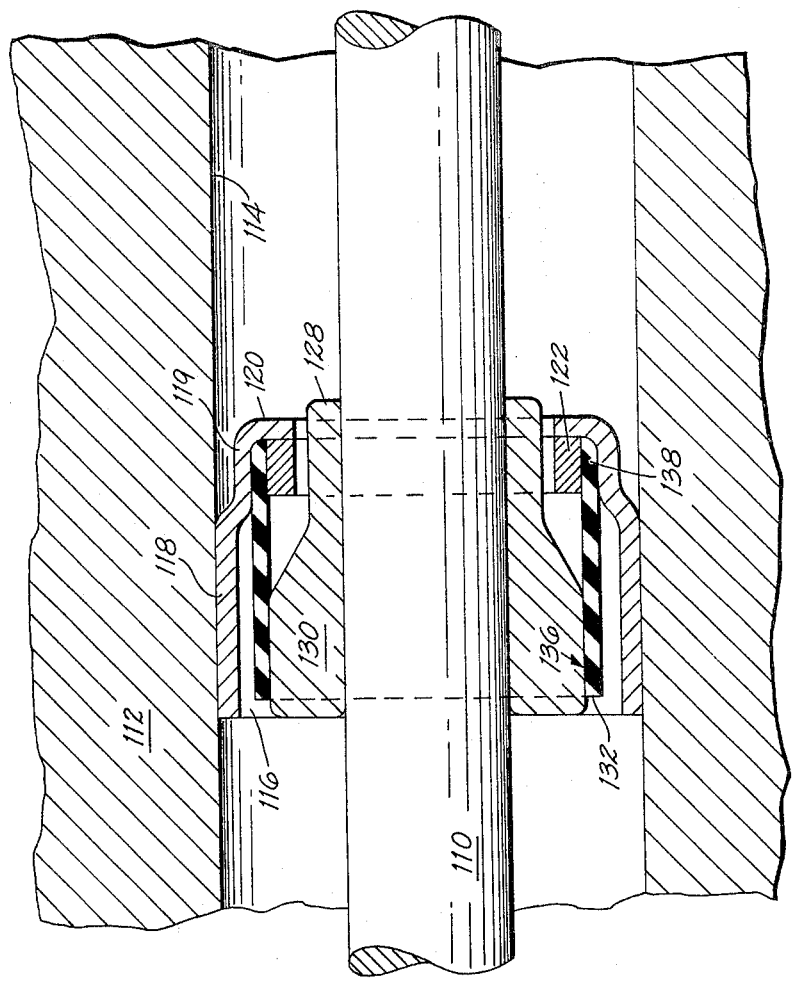

United States Patent Office 3,266,811
Patented August 16, 1966

3,266,811
CENTRIFUGAL SEALING MEANS
Johannes Peter Knauth, Hurley, N.Y., assignor to Espey Mfg. & Electronics Corporation, a corporation of New York
Filed July 23, 1963, Ser. No. 297,106
1 Claim. (Cl. 277—25)

The present invention relates to sealing means and more particularly to sealing means on rotary devices.

It is extremely difficult to provide seals for rotary devices when these devices must exist in two states, in motion and at rest. The two states are completely different and the factors which apply under one set of circumstances are totally different than the factors which apply under others. In some devices, such as steam turbines, a seal is maintained during rotation by a series of labyrinths, but the most intricate labyrinth will not act as a seal during the state of rest, and at rest, steam escapes from the device. The same situation applies to motors, generators, etc., operating in textile factories where lint and dust fly around. During rotation, an air seal can be created to prevent penetration by harmful external particles, but at rest, the physical sealing of the device is required. Although many attempts may have been made to provide a frictionless seal for a rotating device which will act as a seal at rest, none, as far as I am aware has ever been successful when carried out into practice on an industrial scale.

It has now been discovered that a seal can be provided to seal off a rotary device at rest and still provide no friction during rotation.

Thus, it is an object of the present invention to provide a frictionless seal.

Still another object of the present invention is to provide a seal which can readily be affixed to motors, generators, steam turbines, etc.

The invention also contemplates an arragement which is simple to manufacture and to affix.

With the foregoing and other objects in view, the invention resides in the novel arrangement and combination of components and in the details of construction hereinafter described, it being understood that changes in the precise embodiment of the invention herein disclosed may be made within the scope of what is described without departing from the spirit of the invention.

The invention in its broadest aspects contemplates a sealing arrangement between a rotor and a stator comprising cylindrical resilient means coupled to the rotor, cylindrical wall means coupled to the stator disposed so that said resilient means tends to grip said wall means at rest to form a seal but tend to separate therefrom by centrifugal force during rotation, and support means coupled to said rotor on the outer side of the resilient means in close proximity thereto to support said resilient means when under the influence of centrifugal force.

The invention and its advantages will become apparent from the following description taken in conjunction with the accompanying drawing, in which:

FIGURE 1 is a longitudinal cross-sectional view of one embodiment of the sealing means contemplated herein; and FIGURE 2 shows a longitudinal cross-sectional view of another embodiment of the sealing means contemplated herein.

In the first practical embodiment depicted in FIGURE 1, there is shown a rotor shaft 10 and a stator housing 12, with an inner cylindrical wall 14 around shaft 10. Mounted along this inner cylindrical wall 14 is a collar 16 having an outer cylindrical collar wall 18, a radial wall 20, and an inner cylindrical collar wall 22 separated from the outer cylindrical collar wall 18 by the distance set by radial wall 20. Inner cylindrical collar wall 22 has an inwardly projecting end 24, i.e., projecting towards shaft 10.

Disposed around shaft 10, and about concentric with collar 16 is a boss 26 having an upper thin section 28 extending almost to the location of radial wall 20, and a stub section 30 projection somewhat beyond the open end of the collar. Disposed around the stub section 30 of the boss is a resilient cup, i.e., rubber cup 32 having a rubber cup base 34 whose size is defined by the radius of the stub section 30 of boss 26, i.e., the rubber cup base 34 fits snugly around the stub section, and the rubber cup cylindrical portion 36 fits around the cylindrical wall provided by the stub portion 30, and comes to rest on the outer face of inner cylindrical collar wall 22.

As depicted in the drawing, the radius of stub section 30 and of radial wall 20 of collar 16 are so sized that the rubber cup cylindrical portion 36 passing over the stub section 30 will grip radial wall 20. The rubber cup is held around the base of shaft 10 by a cylindrical cup neck 38 which seals the shaft and is in turn held in place by a solid cup 40 made of metal having a radial base 2 which clamps the neck 38 to shaft 10 and a solid cylindrical wall with an outwardly flanging end portion 44. Solid cup 40 acts as a support for the rubber cup 32 and holds rubber cup 32 against stub section 30 of the boss, the rubber cup cylindrical portion 36 resting tightly against the outer face of inner cylindrical collar wall 22, while the device is at rest. As shaft 10 starts to rotate, centrifugal force will tend to drive the rubber cup cylindrical portion 36 outward away from inner cylindrical collar wall 22. Thus, under static conditions, particularly if the seal is submerged in a liquid, the fluid pressure helps seal the rubber cup 32 against the stub section 30 of the boss, as indicated by the letter P. However, as rotational speed increases, the rubber cup tends to fly out radially. The rubber cup would be torn apart were it not for the support given it by the flanged solid cup cylindrical portion 44.

Although the foregoing explanation is sufficient for an understanding of the working of the invention, certain details are necessary in practice. As is readily evident, the shaft at rest is to be brought to rapid rotational speed in a very short time, e.g. 10,000 r.p.m. Since the rubber cup rests on the collar wall, there is an initial period of friction between the rubber and the wall. A low coefficient of friction of rubber material to collar material must therefore be provided. This is accomplished to some extent by using a silicone rubber material for the cup and spraying the entire inside of the collar with a coating of a fluorocarbon resin substance such as Teflon as described for example in Arthur & Elizabeth Rose "The Condensed Chemical Dictionary" Reinhold Publishing Co., 1961 edition, page 1110.

The low coefficient of friction can also be enhanced by the constructional features, as shown in the drawing. Inner collar wall 22 has its inwardly projecting end 24 terminating in close proximity to stub portion 30 of the boss. Unless this is so, there will be a tendency for the rubber cup to inwardly buckle at this section. Also, the amount of the rubber cup cylindrical portion that rests on the collar inner wall is important. It must be of sufficient length to form a seal, sufficient to prevent inward buckling at the space between end 24 and stub portion 30 and short enough to prevent any unnecessary friction. Although certain features are predictable by the known characteristics of the materials, the precise minimum length that the rubber cup extends along the collar can only be ascertained by a trial run. To load the cup on the boss, a stepped loading tool should be used to push the cup in properly.

The second embodiment depicted, will usually find application where devices of the inside-out type are used. Here there is a stator shaft 110 and a rotor housing 112 with a housing inner cylindrical wall 114. Affixed to the cylindrical wall 114 is a collar 116 having an outer collar wall 118 fastened to the cylindrical wall 114, an inwardly recessed section 119 and a radial section 120 extending from the inwardly recessed section 119. Radial section 120 extends towards the stator shaft 110 and has affixed thereto an inner collar wall 122. Mounted on stator shaft 110 is a boss 126 having a thin portion 128 and a stub portion 130. This boss is so disposed that the stub portion terminates at about the outer end of outer collar wall 118 and the thin portion 128 extends out past the collar 116. The entire disposition of the boss and the collar is such that the inner collar wall 122 just about clears the thin portion 128 of the boss and the inner side of the inner collar wall is about at the same radial distance from the shaft as the outer surface of the stub portion 130 of the boss. The inner collar wall 122 and the collar recessed section 119 act to retain therebetween a resilient sleeve 132 e.g., of rubber which will rest solidly on the outer surface of the stub portion 130, thus, one end section 136 rests on the stub portion of the boss while the other end section 138 is retained by collar 116 at the recessed section 119. As the rotor housing 112 starts to turn, centrifugal force will tend to drive the rubber sleeve outward from the stub portion 130 towards outer collar wall 118 so that as the rotor turns there is no engagement between the sleeve and stub portion 130.

The constructional features of the second embodiment are similar to those of the first embodiment. In this embodiment, it is the boss which is sprayed with a coating of a fluorocarbon resin substance such as Teflon and the rubber sleeve is made of silicone rubber. Stub portion 130 of the boss should extend outward as much as possible towards the rotor inner wall 114. This increases the flywheel effect to overcome the initial friction between the rubber sleeve and the boss. Collar inner wall 122 should extend towards stub portion to prevent buckling of the sleeve and the amount of engagement between the sleeve and the stub portion 130 should be the minimum required to form a seal. Unlike in the first embodiment, no special loading tool is required. The sleeve can readily be eased into place and held by the collar.

It is to be observed therefore that the present invention provides for a seal on rotating devices when the device is stationary. The seal is frictionless while the device is in motion and takes hold automatically at rest. When the rotating device is a shaft rotating in a cylindrical wall the arrangement includes a cylindrical collar with a cylindrical outer collar wall mounted on the housing wall, a radial wall and a cylindrical inner collar wall separated from the outer cylindrical collar wall by the distance of the radial wall, a boss mounted on the shaft with a thin section extending towards the radial wall and a stub section towards the open end of the collar; a resilient cup is disposed around the stub section, the cylindrical portion thereof resting on the outer face of the inner cylindrical collar wall, and includes a neck sealed to the shaft; and, a solid cup fitted over the cylindrical cup with an outwardly flanged end portion whereby, at rest, the resilient cup rests on the inner cylindrical collar wall forming a seal but during rotation the resilient cup will be driven outward away from said wall towards the flanged end portion of the solid cup where it is supported.

When the rotating device includes a rotor cylindrical wall rotating around a stator shaft the arrangement includes a collar with an outer collar wall fastened to the rotor cylindrical wall, an inwardly recessed section, a radial section extending from said recessed section and an inner collar wall disposed for rotation over said shaft; a boss having a thin portion and a stub portion disposed concentric with said collar the thin section extending towards said radial section; and, a resilient sleeve retained between said inner collar wall and said recessed section disposed to rest on said stub portion, thereby forming a seal at rest between said sleeve and stub portion which seal is broken only by the action of centrifugal force outwardly driving that part of the sleeve resting on said stub portion.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and appended claim.

I claim:

A sealing means between a cylindrical rotor housing wall and a stator shaft, comprising in combination;

a cylindrical collar with an outer cylindrical collar wall fastened to the rotor cylindrical wall, said collar having an inwardly recessed section, a radial section extending from said recessed section and, an inner collar wall affixed to said radial section disposed for rotation over said shaft;

a boss having a thin portion and a stub portion disposed concentric with said collar, said boss having thereon a coating of fluorocarbon resin, the thin portion extending towards said radial section, said stub portion extending radially outward as far as practical towards said inner collar wall to increase the flywheel effect;

a resilient silicone rubber sleeve retained between said inner collar wall and said recessed section disposed to rest on said stub portion said inner collar wall extending towards said stub portion a distance sufficient to prevent buckling of the sleeve, thereby forming a seal at rest between said sleeve and stub portion which seal is broken only by the action of centrifugal force acting on said sleeve.

References Cited by the Examiner

UNITED STATES PATENTS

| | | | |
|---|---|---|---|
| 2,478,649 | 8/1949 | Wightman | 277—25 |
| 2,781,209 | 2/1957 | Jacobs. | |
| 2,932,535 | 4/1960 | Peickii et al. | 277—15 X |

FOREIGN PATENTS

| | | |
|---|---|---|
| 1,194,763 | 5/1959 | France. |
| 937,800 | 1/1956 | Germany. |

SAMUEL ROTHBERG, *Primary Examiner.*